United States Patent
Xue et al.

(10) Patent No.: US 9,363,743 B2
(45) Date of Patent: Jun. 7, 2016

(54) UTILIZING WI-FI COUNTRY CODE TO ASSIST CELLULAR NETWORK SELECTION

(71) Applicant: BlackBerry Limited, Waterloo (CA)

(72) Inventors: Hao Xue, Ottawa (CA); James Randolph Winter Lepp, Ottawa (CA); Göran Hageltorn, Ottawa (CA); Jean-Philippe Paul Cormier, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/511,833

(22) Filed: Oct. 10, 2014

(65) Prior Publication Data

US 2016/0105843 A1 Apr. 14, 2016

(51) Int. Cl.
*H04W 4/00* (2009.01)
*H04W 48/18* (2009.01)
*H04W 48/08* (2009.01)
*H04W 4/02* (2009.01)
*H04W 88/06* (2009.01)

(52) U.S. Cl.
CPC .............. *H04W 48/18* (2013.01); *H04W 4/02* (2013.01); *H04W 48/08* (2013.01); *H04W 88/06* (2013.01)

(58) Field of Classification Search
CPC ....... H04W 48/18; H04W 48/08; H04W 4/02; H04W 88/06
USPC ........................................................ 455/426.1
See application file for complete search history.

(56) References Cited

U.S. PATENT DOCUMENTS

| 7,650,428 | B1 | 1/2010 | Taaghol et al. | |
| 9,125,146 | B1* | 9/2015 | Edara .................... | H04W 48/18 |
| 2004/0127240 | A1* | 7/2004 | Li ......................... | H04W 48/18 455/500 |
| 2007/0038776 | A1* | 2/2007 | Abhishek .............. | H04W 8/005 709/245 |
| 2008/0259882 | A1* | 10/2008 | Abdel-Kader ........ | H04W 48/16 370/338 |
| 2008/0305784 | A1* | 12/2008 | Dillinger ............... | H04W 8/22 455/418 |
| 2011/0195667 | A1* | 8/2011 | Hassan .................. | H04W 4/00 455/62 |
| 2012/0309391 | A1 | 12/2012 | Zhang | |
| 2013/0281085 | A1* | 10/2013 | Sen ....................... | H04W 48/18 455/426.1 |
| 2015/0117330 | A1* | 4/2015 | Jiang .................... | H04W 40/20 370/329 |
| 2015/0172876 | A1* | 6/2015 | Mustajarvi ........... | H04W 4/06 455/404.1 |

FOREIGN PATENT DOCUMENTS

| EP | 1703756 | 9/2006 |
| EP | 1740001 | 1/2007 |

OTHER PUBLICATIONS

European Patent Office, Extended European Search Report on Application No. 15189858.2 issued on Apr. 6, 2016.

* cited by examiner

*Primary Examiner* — Juan A Torres
(74) *Attorney, Agent, or Firm* — Moffat & Co.

(57) ABSTRACT

A method of selecting a cellular network entails detecting a Wi-Fi signal, obtaining a country code from the Wi-Fi signal, prioritizing cellular network frequency bands based on the country code to define a band priority, and selecting a cellular network based on the band priority. The country code may be an IEEE 802.11d Country Code Information Element.

15 Claims, 5 Drawing Sheets

UTILIZING WI-FI COUNTRY CODE TO ASSIST CELLULAR NETWORK SELECTION

TECHNICAL FIELD

The present technology relates generally to wireless communications and, in particular, to cellular network selection techniques.

BACKGROUND

When a cellular radiofrequency transceiver of a mobile device is activated, the mobile device seeks to acquire a suitable wireless network in order to obtain voice and data services. Cellular network selection algorithms enable the mobile device to find the optimal wireless network under various conditions.

In General Packet Radio Service (GPRS), Universal Mobile Telecommunications System (UMTS) and Long Term Evolution (LTE) cellular networks, a public land mobile network (PLMN) list is normally used for the cellular network selection. The PLMN list contains a list of networks specifying a mobile country code (MCC) and a mobile network code (MNC) with a priority order. The PLMN list combined with access technology are typically stored in a subscriber identity module (SIM) or universal subscriber identity module (USIM) card. The mobile device scans all the channels within GPRS or UMTS or LTE band groups until a suitable system is found.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

On activation of a cellular radiofrequency transceiver of a mobile device, it is desirable for the mobile device to execute a network selection algorithm that finds a cellular network quickly in order to prolong battery life and to provide a good user experience.

However, mobile devices today need to scan an ever-growing set of cellular network frequency bands and radio access technologies (RATs). This scan can take a significant amount of time to complete while also depleting the battery. A technique to assist cellular network selection is therefore highly desirable.

The present disclosure provides a technique for selecting a cellular network by obtaining a country code from a Wi-Fi signal of a Wi-Fi transceiver (or access point). This country code is used to expedite the band search by prioritizing the cellular network frequency bands, thereby reducing the time to acquire a cellular network.

Accordingly, one aspect of the present disclosure is a method of selecting a cellular network. The method entails detecting a Wi-Fi signal, obtaining a country code from the Wi-Fi signal, prioritizing cellular network frequency bands based on the country code to define a band priority and selecting a cellular network based on the band priority.

Another aspect of the present disclosure is a non-transitory computer-readable medium comprising instructions in code which when loaded into a memory and executed by a processor of a mobile device cause the mobile device to detect a Wi-Fi signal, obtain a country code from the Wi-Fi signal, prioritize cellular network frequency bands based on the country code to define a band priority, and select a cellular network based on the band priority.

Another aspect of the present disclosure is a mobile device that includes a cellular radiofrequency transceiver and a Wi-Fi transceiver that detects a Wi-Fi signal. The mobile device also includes a processor operatively coupled to the Wi-Fi transceiver to obtain a country code from the Wi-Fi signal. The mobile device further includes a memory operatively coupled the processor for storing the country code. The processor prioritizes cellular network frequency bands based on the country code to define a band priority and cooperates with the cellular radiofrequency transceiver to select a cellular network based on the band priority.

The details and particulars of these aspects of the technology will now be described below, by way of example, with reference to the drawings.

In general, this technology may be implemented by a mobile device (e.g., a mobile communications device, wireless communications device, tablet, personal digital assistant, cell phone, smart phone, smart watch, smart accessory, gaming device or any other portable electronic device that has a cellular transceiver and a Wi-Fi receiver from which the country code is extracted.

Figure 1:
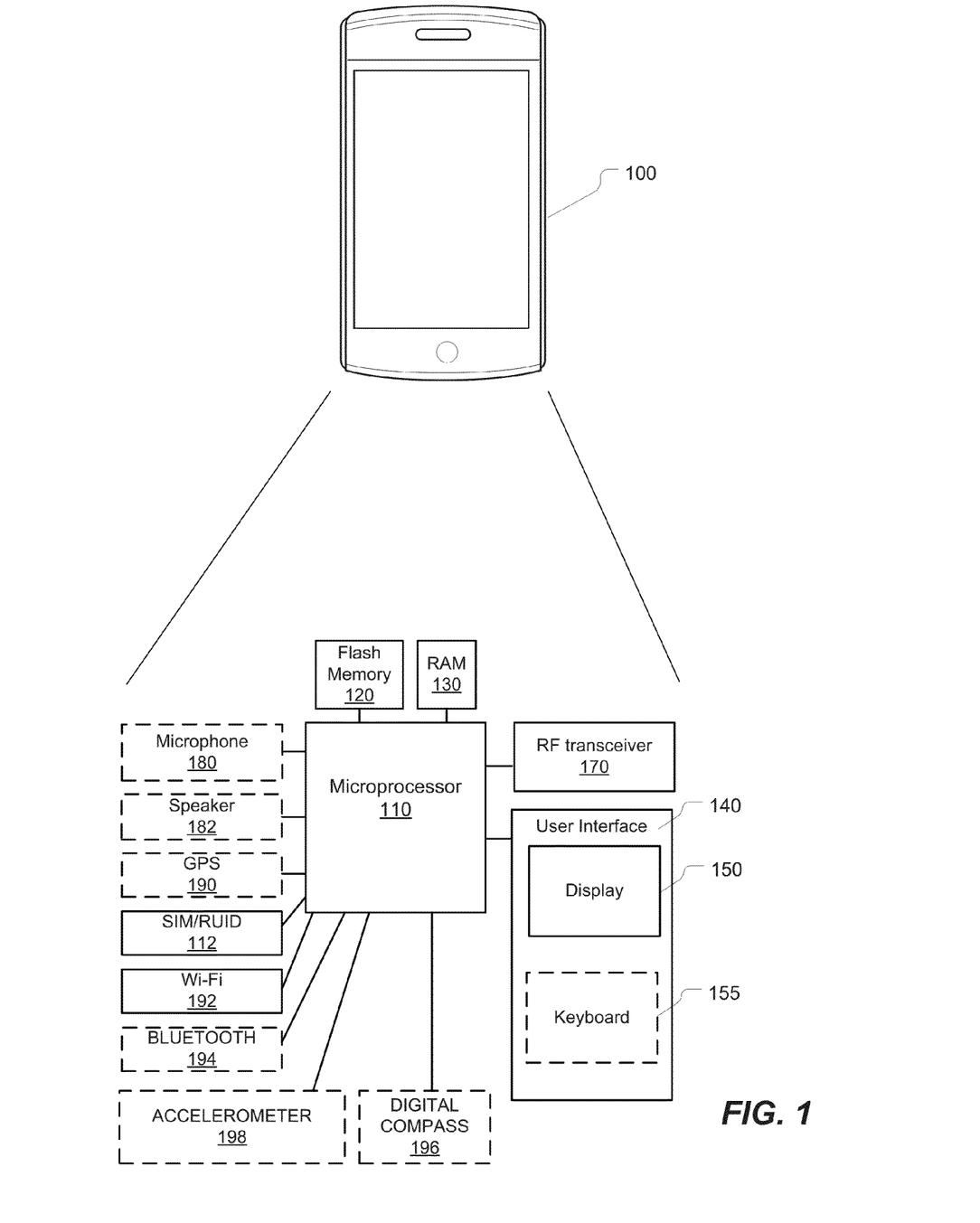
FIG. 1 is a depiction of an example mobile device in accordance with one embodiment of the present disclosure.

FIG. 1 is a depiction of an example mobile device implementing the present technology. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more input/output devices, such as a display screen 150 (e.g. an LCD or LED screen or touch-sensitive display screen), and may optionally include a keyboard or keypad 155. The user interface may also include an optical jog pad and/or a thumbwheel, trackball, track pad or equivalent.

As depicted by way of example in FIG. 1, the mobile device 100 may include a cellular radiofrequency (RF) transceiver 170 for communicating with other devices. The cellular radiofrequency transceiver 170 enables wireless communication with one or more base stations over a cellular wireless network using cellular communication protocols and standards for both voice calls and packet data transfer such as GSM, CDMA, GPRS, EDGE, UMTS, LTE, etc.

The mobile device 100 may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 optionally includes a speech-recognition subsystem that has a microphone 180 for transforming voice input in the form of sound waves into an electrical signal. Optionally, the mobile device 100 may include a speaker 182 and/or an earphone jack.

The mobile device 100 optionally includes a position-determining subsystem such as a global navigation satellite system (GNSS) receiver, for example a Global Positioning System (GPS) receiver 190 (e.g. in the form of a chip or chipset) for receiving GNSS (e.g. GPS) radio signals transmitted from one or more orbiting GNSS (e.g. GPS) satellites.

The mobile device 100 includes a Wi-Fi transceiver 192 (which may, in some embodiments, be just a Wi-Fi receiver) for receiving a Wi-Fi signal transmitted by a Wi-Fi access point, router, adapter or hotspot. Although Wi-Fi® is a registered trademark of the Wi-Fi Alliance, it shall be identified simply as "Wi-Fi" in this specification. Wi-Fi encompasses the IEEE 802.11 standard and all its drafts and amendments.

The mobile device 100 optionally includes a Bluetooth® transceiver 194, and/or a near-field communications (NFC) chip. The mobile device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass 196 and/or accelerometer 198. Other sensors may include a tilt sensor, gyroscope or equivalent.

Figure 2:
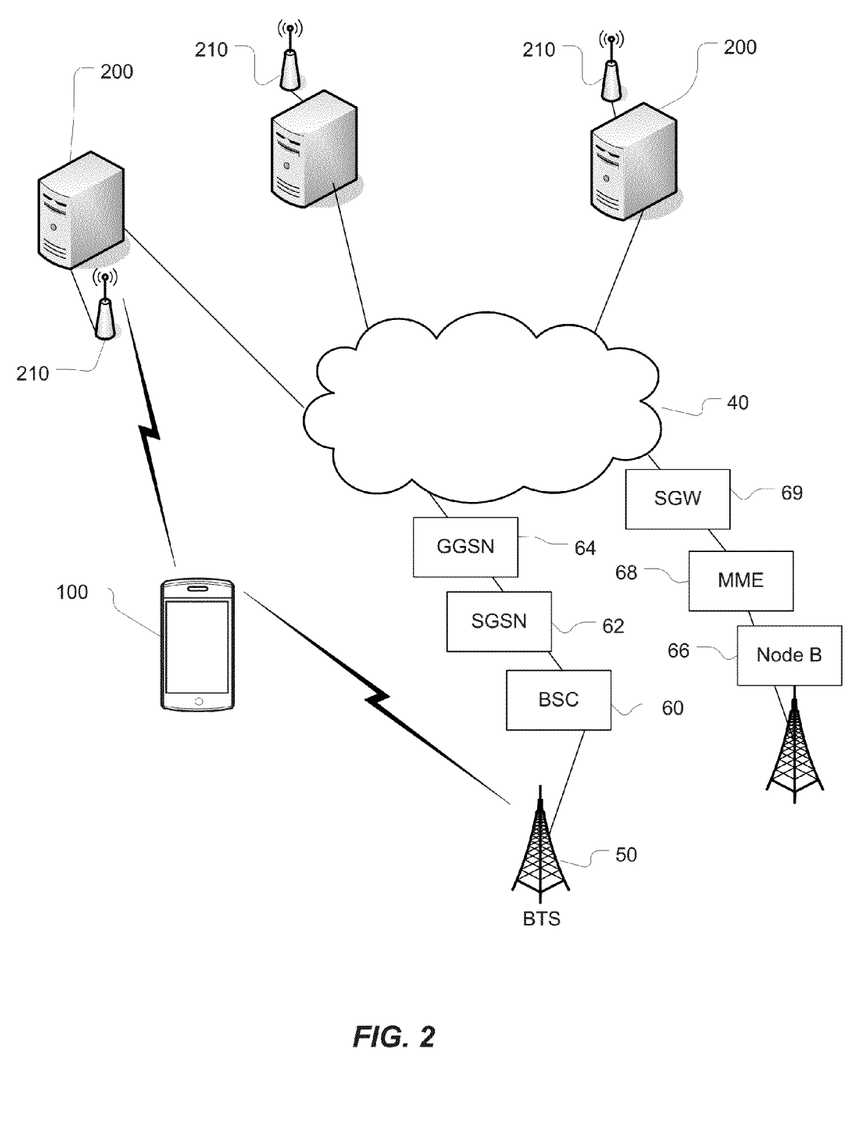
FIG. 2 is a depiction of a system in accordance with one embodiment of the present disclosure.

In the embodiment depicted by way of example in FIG. 2, the mobile device 100 detects a Wi-Fi signal using the Wi-Fi transceiver 192 of the mobile device 100 that is broadcast by a Wi-Fi access point 210. The mobile device 100 obtains a country code from the Wi-Fi signal broadcast by the Wi-Fi access point. Using this country code the mobile device can efficiently search the cellular network frequency bands for a desired cellular network by prioritizing the bands based on location. Each cellular network frequency band has an associated frequency range. For example, the cellular RF transceiver chipset(s) of the mobile device may enable the mobile device to operate on one or more networks bands. For example, for FD-LTE, these may be bands 1, 2, 3, 4, 5, 7, 8, 13, 17, 20 (i.e. on 2100/1900/1800/1700/850/2600/900/700/700/800 MHz, respectively). For example, for HSPA+, bands 1, 2, 4, 5/6, 8 (i.e. 2100/1900/1700/850/900 MHz, respectively) may be used. For example, a quad-band GSM/GPRS/EDGE transceiver may use bands at the frequencies of 850/900/1800/1900 MHz.

The Wi-Fi access point 210 is connected to a server 200 or other computing device that is connected to a data network 40 such as the Internet. Once the desired cellular network is identified, the mobile device 100 connects to the cellular network via a base transceiver station (BTS) 50, base station controller (BSC) 60, Serving GPRS Support Node (SGSN) 62, and Gateway GPRS Support Node (GGSN) 64. In an LTE implementation, the mobile device connects via eNode B (base station) 66, mobility management entity (MME) 68 and serving gateway (SGW) 69.

Figure 3:
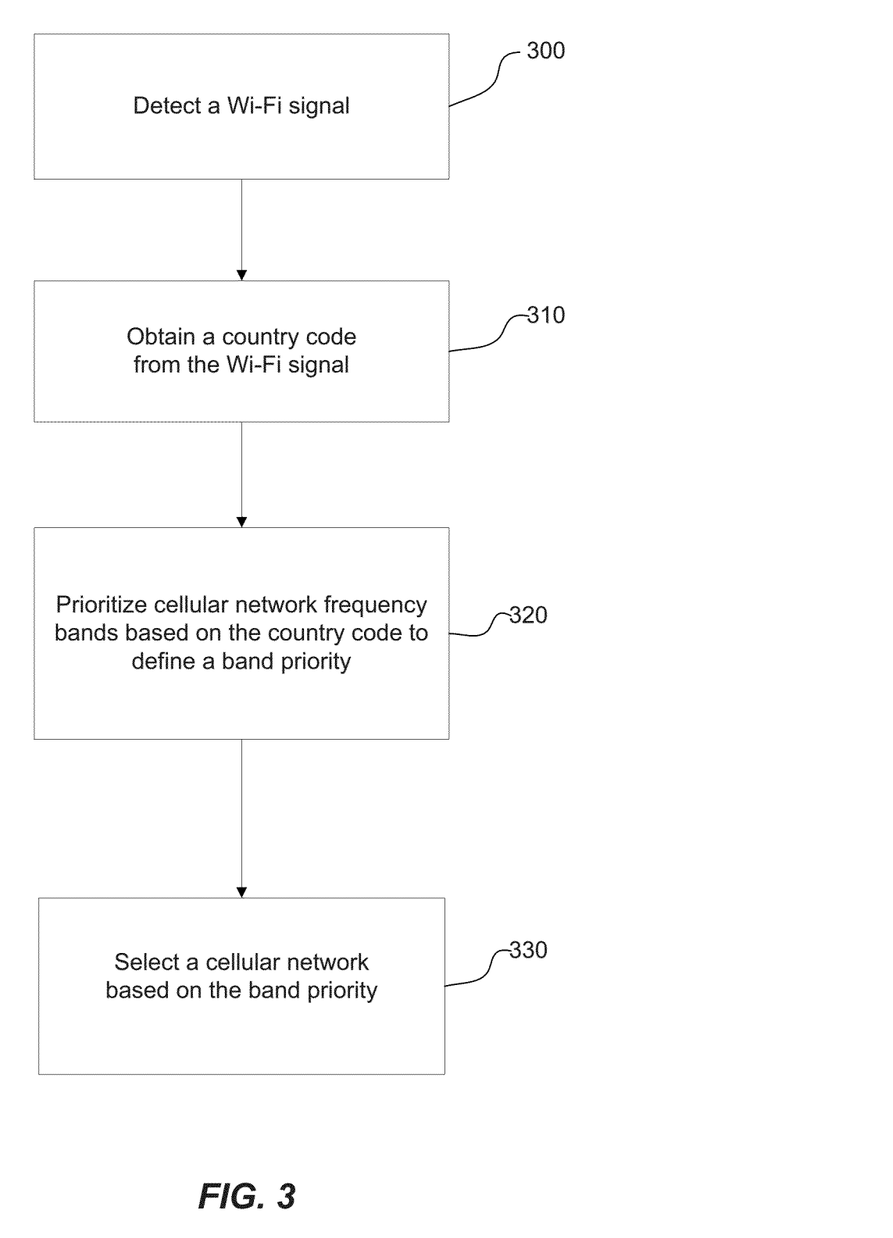
FIG. 3 is a flowchart outlining the method of using a Wi-Fi country code to assist cellular network selection.

A network-selection method is outlined by way of example in FIG. 3. As depicted in the flowchart of FIG. 3, the method entails steps, acts or operations of detecting (300) a Wi-Fi signal, obtaining (310) a country code from the Wi-Fi signal, prioritizing (320) the bands based on the country code to define a band priority, and selecting (330) a cellular network based on the band priority. In one embodiment, the country code is an IEEE 802.11d Country Code Information Element.

Any other country code or equivalent country-specifying data available from any other IEEE 802.11-compliant Wi-Fi signal may be used.

The detecting of the Wi-Fi signal, in one embodiment, occurs in response to activating a cellular radiofrequency transceiver. In other words, the processor of the mobile device may be configured to search for a broadcast Wi-Fi signal and to look for a country code in the Wi-Fi signal whenever a cellular transceiver is activated. The user interface of the mobile device may call the feature that activates and deactivates the cellular radiofrequency transceiver "Airplane Mode". As such activating the cellular transceiver may be called "deactivating Airplane Mode". In another embodiment, the activation of the cellular radiofrequency transceiver may be in response to a signal received from a Bedside Mode setting on the mobile device that reactivates the transceiver when the Beside Mode is no longer on. In another embodiment, the activation of the cellular radiofrequency transceiver may be in response to a signal received from a Child Mode application on the mobile device that disables and enables the cellular RF transceiver. In another embodiment, activation of the cellular radiofrequency transceiver may occur when the cellular RF transceiver is disabled for roaming and then enabled.

In another embodiment, the detecting occurs in response to powering on the mobile device. In other words, the processor of the mobile device may be configured to search for a broadcast Wi-Fi signal and to look for a country code in the Wi-Fi signal as part of the boot-up or start-up routine when the mobile device is turned on.

Besides utilizing the PLMN list for the cellular network selection, a GPRS/UMTS/LTE system may use acquisition history to speed up the initial network acquisition upon power on or radio on. This is helpful when the mobile device is physically located in the same geographic region in which it was most recently operating upon power up or radio on. As a result, in a GSM/UMTS/LTE system, the RPLMN (registered PLMN) is used for the initial network selection upon power up or radio on. The mobile device selects the RPLMN using all access technologies that the mobile device is capable of to perform a Location Registration. This method speeds up the network selection if a mobile device stays in the same geographic area during power down or radio off. However, when the physical location of the mobile device has changed to a different geographic area or even a different country, upon power on or radio on the acquisition history will not help for the initial network selection.

It would thus be very helpful to know the device's geographic region when performing the initial network selection. In accordance with various embodiments of the present disclosure, the method exploits Wi-Fi technology, which is widely deployed and which is relatively faster to scan and acquire service and thus more battery-efficient since less time is spent scanning. The country code obtained from a broadcast Wi-Fi signal may be used to prioritize cellular network frequency bands to expedite the search for the desired network. In one embodiment, the method utilizes 802.11d Country Code Information Element to facilitate the cellular network selection.

IEEE 802.11d provides regulatory domain support. The access point administrator is allowed to configure the country code field of the access point (AP). This causes the AP to broadcast the identity of the country in which it is operating as a part of its beacons and probe responses. For the Wi-Fi radios operating in the 2.4 GHz band (802.11b/g/n), this feature is optional, but enabled by default on most APs. However, for the Wi-Fi radios operating in the 5 GHz band (802.11a/n/ac), the AP software configures support for 802.11h. When 802.11h is supported, the country code information is broadcast in the beacons. This Country Code IE contains the information required to allow a mobile device to identify the WLAN regulatory domain in which it is located so that it can configure its WLAN interface physical layer for operation in that WLAN regulatory domain.

Upon a triggering event such as power on or radio on, the device performs cellular network selection. The Wi-Fi function is enabled either before or during network selection to perform either a passive or active scan to find the available access points and to determine its location. The mobile device reads the country code from the beacon (Wi-Fi signal) and passes the country code information to the cellular radio's network selection algorithm. The device continues the network selection algorithm if the country code matches its current searching PLMN list. Otherwise, the current network selection algorithm can reorganize (prioritize) the order in which it searches the multiple bands in order to quickly locate a more appropriate band for its current location. In one embodiment, the priority is given to the RPLMN list that matches the country code. If no match is found in the RPLMN list, a new band search list is loaded based upon the country code. The device would then start a new network search on the new band list.

Generating the band priority may, in one embodiment, involve a lookup table containing countries (or sub-country regions) and the associated bands. In one embodiment, a list of bands is already stored in priority order. Alternatively, the list of bands may be a flat list. Alternatively, the list may be learned by the mobile device.

Although four GPRS bands, five UMTS bands and ten to twenty LTE bands are typically supported in most user equipment (mobile devices) today, only a few bands are used in any given country. For example, there are over forty LTE bands defined for use around the world, but several of them are unique to one country or region. Sometimes the same spectrum band is used for UMTS in one country and used for LTE in another country. LTE has some heterogeneous features called "Carrier Aggregation" or "Dual Connectivity". In this case, it is only useful to scan for Primary Cells (PCells) and not useful to scan for Secondary Cells (SCells). In the case where PCells and SCells in a country are deployed on different bands, this can be taken into consideration in the prioritized list for the country (i.e. de-prioritize scanning the SCell band). An exhaustive search of all bands may still be necessary in some instances for a complete solution. The algorithm may scan the prioritized bands first, and maybe more than once, but eventually the mobile device should scan all supported bands. This will shorten the average time to acquisition using the Wi-Fi Country Code.

The mobile device thus expedites network selection which provides service to the user sooner. Furthermore, various embodiments of the method of the present disclosure advantageously prolong the battery life of the mobile device.

Figure 4:
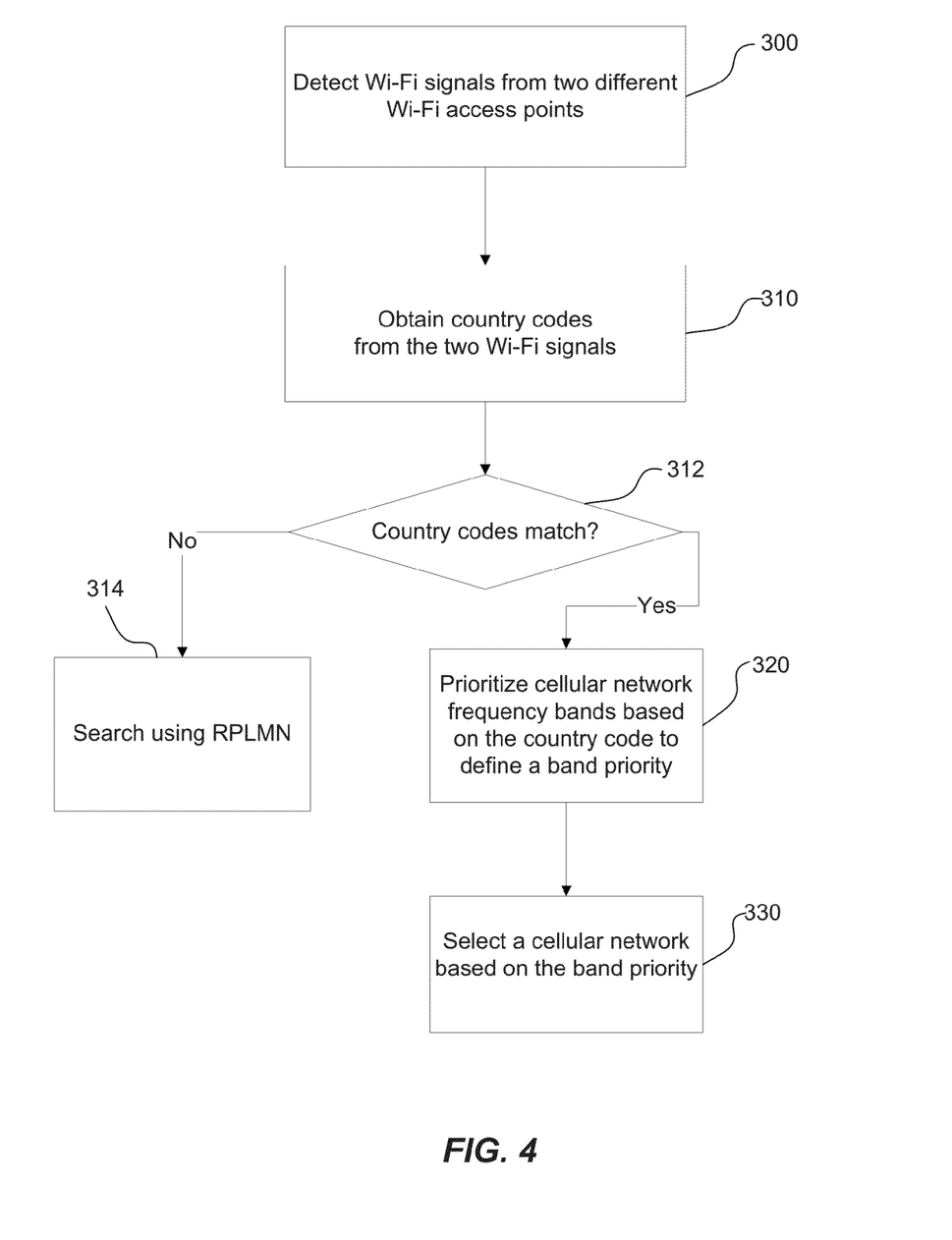
FIG. 4 is another flowchart of a related method.

In one implementation, the mobile device is configured to detect false or inaccurate configurations. Because the country code field is configured by the AP administrator, it is not always accurate. For example, if the AP has moved, it is possible that the country code has not been updated accordingly. To avoid reading incorrect location information, it is better to retrieve the country code from at least two APs. If these country codes match, then it may be assumed that the country code information is correct. If the country code is presumed valid, the device may proceed to prioritize cellular network frequency bands to define a band priority and to select the cellular network based on the band priority. Otherwise, the device will continue to read more beacons from more APs to attempt to obtain at least two matching country codes. Once it is determined that the information is correct the device will reorganize the order in which it will proceed or continue to do its band scan in its cellular radio. Accordingly, one specific implementation of the method, as depicted in FIG. 4, entails obtaining (310) two country codes from two Wi-Fi signals that are transmitted by two different Wi-Fi access points, comparing (312) the two country codes to determine if they match and performing the prioritizing (320) and the selecting (330) only if the two country codes match. Otherwise, if the codes do not match, the search is performed (314) in the standard fashion using RPLMN.

If the mobile device can only find a single AP or if it finds multiple APs but none of them have a matching country code, the device will stop the Wi-Fi search and will not take into account the country code information in its band configuration (i.e. in the prioritization of bands for searching).

The method may be further refined to avoid unnecessary Wi-Fi searching. In most cases, the mobile device should remain in the same geographic area when the trigger event occurs, e.g., a power on or radio on. In order to avoid unnecessary Wi-Fi searches, the mobile device may use a timer T1 to reduce the number of unnecessary Wi-Fi scans. For example, if a certain time, e.g. 60 minutes, has not elapsed between the events of the device powering off (radio off) and the device powering up (radio on), the device will not start the Wi-Fi scan for location detection. The mobile device can trigger a Wi-Fi scan to detect its location after the certain time (e.g. 60 minutes) has elapsed between the same events. Optionally, a total Wi-Fi scan timer T2 may be defined to limit the total scan time. The Wi-Fi scan should only last for this T2 timer and no background scan or back-off algorithm will be applied after T2 timer expires. Accordingly, the method may further entail applying a timer (e.g. the T1 timer) to require a minimum amount of time to elapse before performing the detecting of the broadcast Wi-Fi signal and the obtaining of the country code from the Wi-Fi signal.

The method may be further refined by optimizing the scanning within Wi-Fi. In some embodiments, the Wi-Fi module may be capable of more than one band (such as 2.4 GHz, 5 GHz, or others). In one embodiment, to optimize its scanning procedure, the 2.4 GHz band which has only 11-14 channels is scanned first. Within the 2.4 GHz band, channels may be scanned in an optimized order as well. The 2.4 GHz band has more deployed access points than the 5 GHz band, and 5 GHz access points only exist as dual-band products (as 5 GHz-only devices are almost non-existent in the market). The 2.4 GHz band is fairly uniform in all countries, whereas the 5 GHz and other bands tend to be more regional.

The Wi-Fi-assisted network selection method exploits the geographic location information broadcast in a Wi-Fi signal to expedite the cellular network selection upon a trigger event such as powering on the device ("power on"), disabling "Airplane Mode" or on activating the cellular radio transceiver ("radio on"), or other trigger event especially when the mobile device travels to a different geographic region. This will save device battery life and improve the user experience.

Figure 5:
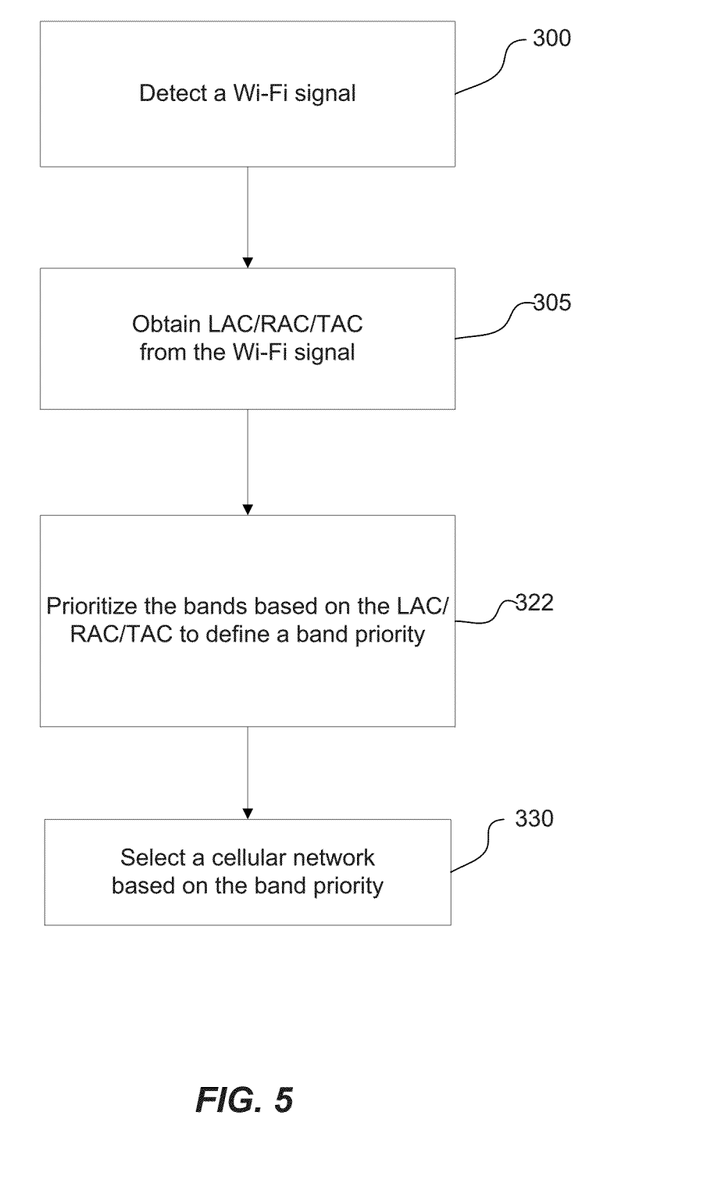
FIG. 5 is another flowchart of a related method.

In one implementation, which is depicted in FIG. 5, the method further includes determining a location area code (LAC) and routing area code (RAC) or a tracking area code (TAC) from the Wi-Fi signal to identify a geographic area smaller than a country to enable further prioritization of the bands based on the geographic area. In other words, in some cases, the geographic region may be determined by the country code whereas, in other cases, such as in a GPRS/UMTS network, the location area code (LAC) and routing area code (RAC) or in an LTE network the Tracking Area Code (TAC) may be used to identify a smaller region to further delimit the bands to be searched. As shown in FIG. 4, this particular implementation of the method thus entails detecting (300) a broadcast Wi-Fi signal, obtaining (305) the LAC/RAC/TAC from the signal, prioritizing (322) cellular network frequency bands based on the LAC/RAC/TAC to define a band priority and selecting (330) a cellular network based on the band priority.

However, more precise location information provided by the Wi-Fi signal may make the cellular network selection even more efficient. For example, the Wi-Fi signal could provide the country plus city name and this would, in turn, be mapped to certain LAC/RAC/TAC, which will reduce the system scan range even more. With the evolution of network selection algorithms, more precise geographic area information could be provided by the Wi-Fi signal.

It will be appreciated that the Wi-Fi-assisted selection method is not restricted to cases where the device is powered on or the cellular radio is activated. This method may also apply to other cases, for example, when the mobile device is out of coverage for a long period of time and mobile device may move to a different geographic region during this period. Wi-Fi could be used to periodically scan to detect an available network.

Although the present disclosure refers to Wi-Fi, it will be understood that this technology may be applied to any other wireless technology that broadcasts a country-identifying code in its beacon or signal.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be examples only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of selecting a cellular network, the method comprising:
   detecting a Wi-Fi signal;
   obtaining a country code from the Wi-Fi signal;
   prioritizing cellular network frequency bands to scan based on the obtained country code to define a band priority;
   selecting a cellular network based on band priority; and
   applying a first timer to set a threshold amount of time to elapse before performing the detecting of the Wi-Fi signal and the obtaining of the country code from the Wi-Fi signal and applying a second timer to limit a total scan time.

2. The method as claimed in claim 1 further comprising determining at least one of a location area code (LAC), routing area code (RAC) or tracking area code (TAC) from the Wi-Fi signal to identify a geographic area smaller than a country to enable further prioritization of the cellular network frequency bands based on the geographic area.

3. The method as claimed in claim 1 comprising:
   obtaining two country codes from two Wi-Fi signals transmitted by two different Wi-Fi access points;
   comparing the two country codes; and
   performing the prioritizing and the selecting only if the two country codes match.

4. The method as claimed in claim 1 wherein the detecting occurs in response to activating a cellular radiofrequency transceiver.

5. The method as claimed in claim 1 wherein the country code is an IEEE 802.11d Country Code Information Element.

6. A non-transitory computer-readable medium comprising instructions in code which when loaded into a memory and executed by a processor of a mobile device cause the mobile device to:
   detect a Wi-Fi signal;
   obtain a country code from the Wi-Fi signal;
   prioritize cellular network frequency bands to scan based on the obtained country code to define a band priority;
   select a cellular network based on the band priority; and
   apply a first timer to set a minimum amount of time to elapse before performing the detecting of the Wi-Fi signal and the obtaining of the country code from the Wi-Fi signal and to apply a second timer to limit a total scan time.

7. The computer-readable medium as claimed in claim 6 further comprising code that causes the mobile device to determine a location area code (LAC), routing area code (RAC) and tracking area code (TAC) from the Wi-Fi signal to identify a geographic area smaller than a country to enable further prioritization of the cellular network frequency bands based on the geographic area.

8. The computer-readable medium as claimed in claim 6 comprising code that causes the mobile device to:
   obtain two country codes from two Wi-Fi signals transmitted by two different Wi-Fi access points;
   compare the two country codes;
   and to prioritize and select only if the two country codes match.

9. The computer-readable medium as claimed in claim 6 comprising code that causes the device to detect the Wi-Fi in response to activating a cellular radiofrequency transceiver.

10. The computer-readable medium as claimed in claim 6 wherein the country code is an IEEE 802.11d Country Code Information Element.

11. A mobile device comprising:
a cellular radiofrequency transceiver;
a Wi-Fi receiver that detects a Wi-Fi signal;
a processor operatively coupled to the Wi-Fi receiver to obtain a country code from the Wi-Fi signal;
a memory operatively coupled the processor for storing the country code;
wherein the processor is configured to:
prioritize cellular network frequency bands to scan based on the country code to define a band priority;
cooperate with the cellular radiofrequency transceiver to select a cellular network based on the band priority; and
apply a first timer to set a minimum amount of time to elapse before detecting of the Wi-Fi signal and obtaining of the country code from the Wi-Fi signal and to apply a second timer to limit a total scan time.

12. The mobile device as claimed in claim 11 wherein the processor is further configured to cooperate with the cellular radiofrequency transceiver to determine a location area code (LAC), routing area code (RAC) and tracking area code (TAC) from the Wi-Fi signal to identify a geographic area smaller than a country and to further prioritize the cellular network frequency bands based on the geographic area.

13. The mobile device as claimed in claim 11 wherein the processor is further configured to cooperate with the cellular radiofrequency transceiver to:
obtain two country codes from two Wi-Fi signals transmitted by two different Wi-Fi access points;
compare the two country codes;
and to prioritize and select only if the two country codes match.

14. The mobile device as claimed in claim 11 wherein the processor is configured to initiate detection of the Wi-Fi signal in response to activating a cellular radiofrequency transceiver.

15. The mobile device as claimed in claim 11 wherein the country code is an IEEE 802.11d Country Code Information Element.

* * * * *